United States Patent
Miller et al.

(10) Patent No.: US 12,093,236 B2
(45) Date of Patent: Sep. 17, 2024

(54) PROBALISTIC DATA STRUCTURE FOR KEY MANAGEMENT

(71) Applicant: PURE STORAGE, INC., Mountain View, CA (US)

(72) Inventors: Ethan Miller, Santa Cruz, CA (US); John Colgrove, Los Altos, CA (US); John Hayes, Mountain View, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 0 days.

(21) Appl. No.: 18/316,779

(22) Filed: May 12, 2023

(65) Prior Publication Data
US 2023/0281179 A1 Sep. 7, 2023

Related U.S. Application Data

(63) Continuation of application No. 16/953,213, filed on Nov. 19, 2020, now Pat. No. 11,675,762, which is a continuation of application No. 14/752,536, filed on Jun. 26, 2015, now Pat. No. 10,846,275.

(51) Int. Cl.
*G06F 16/22* (2019.01)
*G06F 16/215* (2019.01)
*G06F 16/2455* (2019.01)

(52) U.S. Cl.
CPC ........ *G06F 16/2228* (2019.01); *G06F 16/215* (2019.01); *G06F 16/24553* (2019.01)

(58) Field of Classification Search
CPC ............... G06F 16/215; G06F 16/2228; G06F 16/24553
See application file for complete search history.

(56) References Cited

U.S. PATENT DOCUMENTS

| | | | |
|---|---|---|---|
| 5,390,327 A | 2/1995 | Lubbers et al. |
| 5,450,581 A | 9/1995 | Bergen et al. |
| 5,479,653 A | 12/1995 | Jones |
| 5,488,731 A | 1/1996 | Mendelsohn |
| 5,504,858 A | 4/1996 | Ellis et al. |

(Continued)

FOREIGN PATENT DOCUMENTS

| | | |
|---|---|---|
| EP | 2164006 A2 | 3/2010 |
| EP | 2256621 A1 | 12/2010 |

(Continued)

OTHER PUBLICATIONS

Hwang et al., "RAID-x: A New Distributed Disk Array for I/O-Centric Cluster Computing", Proceedings of the Ninth International Symposium on High-performance Distributed Computing, Aug. 2000, pp. 279-286, the Ninth International Symposium on High-Performance Distributed Computing, IEEE Computer Society, Los Alamitos, CA.

(Continued)

*Primary Examiner* — Eliyah S. Harper

(57) ABSTRACT

A method for deleting a set of keys from a storage server is provided. The method includes generating a probabilistic data structure for a first set of keys and for each key in a second set of keys, determining whether a key of the second set of keys is found in the probabilistic data structure. The method includes identifying the key as a candidate for deletion if the key is not found in the probabilistic data structure. A system is also provided.

20 Claims, 6 Drawing Sheets

(56) References Cited

U.S. PATENT DOCUMENTS

| | | | |
|---|---|---|---|
| 5,551,027 A * | 8/1996 | Choy | G06F 16/2228 |
| | | | 711/216 |
| 5,564,113 A | 10/1996 | Bergen et al. | |
| 5,574,882 A | 11/1996 | Menon et al. | |
| 5,649,093 A | 7/1997 | Hanko et al. | |
| 5,883,909 A | 3/1999 | DeKoning et al. | |
| 6,000,010 A | 12/1999 | Legg | |
| 6,260,156 B1 | 7/2001 | Garvin et al. | |
| 6,269,453 B1 | 7/2001 | Krantz | |
| 6,275,898 B1 | 8/2001 | DeKoning | |
| 6,453,428 B1 | 9/2002 | Stephenson | |
| 6,523,087 B2 | 2/2003 | Busser | |
| 6,535,417 B2 | 3/2003 | Tsuda et al. | |
| 6,643,748 B1 | 11/2003 | Wieland | |
| 6,725,392 B1 | 4/2004 | Frey et al. | |
| 6,763,455 B2 | 7/2004 | Hall | |
| 6,836,816 B2 | 12/2004 | Kendall | |
| 6,985,995 B2 | 1/2006 | Holland et al. | |
| 7,032,125 B2 | 4/2006 | Holt et al. | |
| 7,047,358 B2 | 5/2006 | Lee et al. | |
| 7,051,155 B2 | 5/2006 | Talagala et al. | |
| 7,055,058 B2 | 5/2006 | Lee et al. | |
| 7,065,617 B2 | 6/2006 | Wang | |
| 7,069,383 B2 | 6/2006 | Yamamoto et al. | |
| 7,076,606 B2 | 7/2006 | Orsley | |
| 7,107,480 B1 | 9/2006 | Moshayedi et al. | |
| 7,159,150 B2 | 1/2007 | Kenchammana-Hosekote et al. | |
| 7,162,575 B2 | 1/2007 | Dalal et al. | |
| 7,164,608 B2 | 1/2007 | Lee | |
| 7,188,270 B1 | 3/2007 | Nanda et al. | |
| 7,334,156 B2 | 2/2008 | Land et al. | |
| 7,370,220 B1 | 5/2008 | Nguyen et al. | |
| 7,386,666 B1 | 6/2008 | Beauchamp et al. | |
| 7,398,285 B2 | 7/2008 | Kisley | |
| 7,424,498 B1 | 9/2008 | Patterson | |
| 7,424,592 B1 | 9/2008 | Karr et al. | |
| 7,444,532 B2 | 10/2008 | Masuyama et al. | |
| 7,480,658 B2 | 1/2009 | Heinla et al. | |
| 7,484,056 B2 | 1/2009 | Madnani et al. | |
| 7,484,057 B1 | 1/2009 | Madnani et al. | |
| 7,484,059 B1 | 1/2009 | Ofer et al. | |
| 7,536,506 B2 | 5/2009 | Ashmore et al. | |
| 7,558,859 B2 | 7/2009 | Kasiolas et al. | |
| 7,565,446 B2 | 7/2009 | Talagala et al. | |
| 7,613,947 B1 | 11/2009 | Coatney et al. | |
| 7,634,617 B2 | 12/2009 | Misra | |
| 7,634,618 B2 | 12/2009 | Misra | |
| 7,681,104 B1 | 3/2010 | Sim-Tang et al. | |
| 7,681,105 B1 | 3/2010 | Sim-Tang et al. | |
| 7,681,109 B2 | 3/2010 | Litsyn et al. | |
| 7,730,257 B2 | 6/2010 | Franklin | |
| 7,730,258 B1 | 6/2010 | Smith et al. | |
| 7,730,274 B1 | 6/2010 | Usgaonkar | |
| 7,743,276 B2 | 6/2010 | Jacobson et al. | |
| 7,752,489 B2 | 7/2010 | Deenadhayalan et al. | |
| 7,757,038 B2 | 7/2010 | Kitahara | |
| 7,757,059 B1 | 7/2010 | Ofer et al. | |
| 7,774,308 B2 * | 8/2010 | Hillis | G06F 16/2379 |
| | | | 707/622 |
| 7,778,960 B1 | 8/2010 | Chatterjee et al. | |
| 7,783,955 B2 | 8/2010 | Murin | |
| 7,814,272 B2 | 10/2010 | Barrall et al. | |
| 7,814,273 B2 | 10/2010 | Barrall | |
| 7,818,531 B2 | 10/2010 | Barrall | |
| 7,827,351 B2 | 11/2010 | Suetsugu et al. | |
| 7,827,439 B2 | 11/2010 | Mathew et al. | |
| 7,831,768 B2 | 11/2010 | Ananthamurthy et al. | |
| 7,856,583 B1 | 12/2010 | Smith | |
| 7,870,105 B2 | 1/2011 | Arakawa et al. | |
| 7,873,878 B2 | 1/2011 | Belluomini et al. | |
| 7,885,938 B1 | 2/2011 | Greene et al. | |
| 7,886,111 B2 | 2/2011 | Klemm et al. | |
| 7,908,448 B1 | 3/2011 | Chatterjee et al. | |
| 7,916,538 B2 | 3/2011 | Jeon et al. | |
| 7,921,268 B2 | 4/2011 | Jakob | |
| 7,930,499 B2 | 4/2011 | Duchesne | |
| 7,941,697 B2 | 5/2011 | Mathew et al. | |
| 7,958,303 B2 | 6/2011 | Shuster | |
| 7,971,129 B2 | 6/2011 | Watson et al. | |
| 7,975,115 B2 | 7/2011 | Wayda et al. | |
| 7,984,016 B2 | 7/2011 | Kisley | |
| 7,991,822 B2 | 8/2011 | Bish et al. | |
| 8,006,126 B2 | 8/2011 | Deenadhayalan et al. | |
| 8,010,485 B1 | 8/2011 | Chatterjee et al. | |
| 8,010,829 B1 | 8/2011 | Chatterjee et al. | |
| 8,020,047 B2 | 9/2011 | Courtney | |
| 8,046,548 B1 | 10/2011 | Chatterjee et al. | |
| 8,051,361 B2 | 11/2011 | Sim-Tang et al. | |
| 8,051,362 B2 | 11/2011 | Li et al. | |
| 8,074,038 B2 | 12/2011 | Lionetti et al. | |
| 8,082,393 B2 | 12/2011 | Galloway et al. | |
| 8,086,603 B2 | 12/2011 | Nasre et al. | |
| 8,086,634 B2 | 12/2011 | Mimatsu | |
| 8,086,911 B1 | 12/2011 | Taylor | |
| 8,090,837 B2 | 1/2012 | Shin et al. | |
| 8,108,502 B2 | 1/2012 | Tabbara et al. | |
| 8,117,388 B2 | 2/2012 | Jernigan, IV | |
| 8,117,521 B2 | 2/2012 | Parker et al. | |
| 8,140,821 B1 | 3/2012 | Raizen et al. | |
| 8,145,838 B1 | 3/2012 | Miller et al. | |
| 8,145,840 B2 | 3/2012 | Koul et al. | |
| 8,175,012 B2 | 5/2012 | Chu et al. | |
| 8,176,360 B2 | 5/2012 | Frost et al. | |
| 8,176,405 B2 | 5/2012 | Hafner et al. | |
| 8,180,855 B2 | 5/2012 | Aiello et al. | |
| 8,200,922 B2 | 6/2012 | Mckean et al. | |
| 8,209,469 B2 | 6/2012 | Carpenter et al. | |
| 8,225,006 B1 | 7/2012 | Karamcheti | |
| 8,239,618 B2 | 8/2012 | Kotzur et al. | |
| 8,244,999 B1 | 8/2012 | Chatterjee et al. | |
| 8,261,016 B1 | 9/2012 | Goel | |
| 8,271,455 B2 | 9/2012 | Kesselman | |
| 8,285,686 B2 | 10/2012 | Kesselman | |
| 8,305,811 B2 | 11/2012 | Jeon | |
| 8,315,999 B2 | 11/2012 | Chatley et al. | |
| 8,327,080 B1 | 12/2012 | Der | |
| 8,335,769 B2 | 12/2012 | Kesselman | |
| 8,341,118 B2 | 12/2012 | Drobychev et al. | |
| 8,351,290 B1 | 1/2013 | Huang et al. | |
| 8,364,920 B1 | 1/2013 | Parkison et al. | |
| 8,365,041 B2 | 1/2013 | Olbrich et al. | |
| 8,375,146 B2 | 2/2013 | Sinclair | |
| 8,397,016 B2 | 3/2013 | Talagala et al. | |
| 8,402,152 B2 | 3/2013 | Duran | |
| 8,412,880 B2 | 4/2013 | Leibowitz et al. | |
| 8,423,739 B2 | 4/2013 | Ash et al. | |
| 8,429,436 B2 | 4/2013 | Fillingim et al. | |
| 8,452,928 B1 | 5/2013 | Ofer et al. | |
| 8,473,698 B2 | 6/2013 | Lionetti et al. | |
| 8,473,778 B2 | 6/2013 | Simitci et al. | |
| 8,473,815 B2 | 6/2013 | Chung et al. | |
| 8,479,037 B1 | 7/2013 | Chatterjee et al. | |
| 8,484,414 B2 | 7/2013 | Sugimoto et al. | |
| 8,498,967 B1 | 7/2013 | Chatterjee et al. | |
| 8,504,797 B2 | 8/2013 | Mimatsu | |
| 8,522,073 B2 | 8/2013 | Cohen | |
| 8,533,408 B1 | 9/2013 | Madnani et al. | |
| 8,533,527 B2 | 9/2013 | Daikokuya et al. | |
| 8,539,177 B1 | 9/2013 | Madnani et al. | |
| 8,544,029 B2 | 9/2013 | Bakke et al. | |
| 8,549,224 B1 | 10/2013 | Zeryck et al. | |
| 8,583,861 B1 | 11/2013 | Ofer et al. | |
| 8,589,625 B2 | 11/2013 | Colgrove et al. | |
| 8,595,455 B2 | 11/2013 | Chatterjee et al. | |
| 8,615,599 B1 | 12/2013 | Takefman et al. | |
| 8,627,136 B2 | 1/2014 | Shankar et al. | |
| 8,627,138 B1 | 1/2014 | Clark et al. | |
| 8,639,669 B1 | 1/2014 | Douglis et al. | |
| 8,639,863 B1 | 1/2014 | Kanapathippillai et al. | |
| 8,640,000 B1 | 1/2014 | Cypher | |
| 8,650,343 B1 | 2/2014 | Kanapathippillai et al. | |
| 8,660,131 B2 | 2/2014 | Vermunt et al. | |
| 8,661,218 B1 | 2/2014 | Piszczek et al. | |
| 8,671,072 B1 | 3/2014 | Shah et al. | |

(56) References Cited

U.S. PATENT DOCUMENTS

| | | |
|---|---|---|
| 8,689,042 B1 | 4/2014 | Kanapathippillai et al. |
| 8,700,875 B1 | 4/2014 | Barron et al. |
| 8,706,694 B2 | 4/2014 | Chatterjee et al. |
| 8,706,914 B2 | 4/2014 | Duchesneau |
| 8,706,932 B1 | 4/2014 | Kanapathippillai et al. |
| 8,712,963 B1 | 4/2014 | Douglis et al. |
| 8,713,405 B2 | 4/2014 | Healey, Jr. et al. |
| 8,719,621 B1 | 5/2014 | Karmarkar |
| 8,725,730 B2 | 5/2014 | Keeton et al. |
| 8,751,859 B2 | 6/2014 | Becker-Szendy et al. |
| 8,756,387 B2 | 6/2014 | Frost et al. |
| 8,762,793 B2 | 6/2014 | Grube et al. |
| 8,769,232 B2 | 7/2014 | Suryabudi et al. |
| 8,775,858 B2 | 7/2014 | Gower et al. |
| 8,775,868 B2 | 7/2014 | Colgrove et al. |
| 8,788,913 B1 | 7/2014 | Xin et al. |
| 8,793,447 B2 | 7/2014 | Usgaonkar et al. |
| 8,799,746 B2 | 8/2014 | Baker et al. |
| 8,819,311 B2 | 8/2014 | Liao |
| 8,819,383 B1 | 8/2014 | Jobanputra et al. |
| 8,822,155 B2 | 9/2014 | Sukumar et al. |
| 8,824,261 B1 | 9/2014 | Miller et al. |
| 8,832,528 B2 | 9/2014 | Thatcher et al. |
| 8,838,541 B2 | 9/2014 | Camble et al. |
| 8,838,892 B2 | 9/2014 | Li |
| 8,843,700 B1 | 9/2014 | Salessi et al. |
| 8,850,108 B1 | 9/2014 | Hayes et al. |
| 8,850,288 B1 | 9/2014 | Azier et al. |
| 8,856,593 B2 | 10/2014 | Eckhardt et al. |
| 8,856,619 B1 | 10/2014 | Cypher |
| 8,862,617 B2 | 10/2014 | Kesselman |
| 8,862,847 B2 | 10/2014 | Feng et al. |
| 8,862,928 B2 | 10/2014 | Xavier et al. |
| 8,868,825 B1 | 10/2014 | Hayes et al. |
| 8,874,836 B1 | 10/2014 | Hayes et al. |
| 8,880,793 B2 | 11/2014 | Nagineni |
| 8,880,825 B2 | 11/2014 | Lionetti et al. |
| 8,886,778 B2 | 11/2014 | Nedved et al. |
| 8,898,383 B2 | 11/2014 | Yamamoto et al. |
| 8,898,388 B1 | 11/2014 | Kimmel |
| 8,904,231 B2 | 12/2014 | Coatney et al. |
| 8,918,478 B2 | 12/2014 | Ozzie et al. |
| 8,930,307 B2 | 1/2015 | Colgrove et al. |
| 8,930,633 B2 | 1/2015 | Amit et al. |
| 8,943,357 B2 | 1/2015 | Atzmony |
| 8,949,502 B2 | 2/2015 | McKnight et al. |
| 8,959,110 B2 | 2/2015 | Smith et al. |
| 8,959,388 B1 | 2/2015 | Kuang et al. |
| 8,972,478 B1 | 3/2015 | Storer et al. |
| 8,972,779 B2 | 3/2015 | Lee et al. |
| 8,977,597 B2 | 3/2015 | Ganesh et al. |
| 8,996,828 B2 | 3/2015 | Kalos et al. |
| 9,003,144 B1 | 4/2015 | Hayes et al. |
| 9,009,724 B2 | 4/2015 | Gold et al. |
| 9,021,053 B2 | 4/2015 | Bernbo et al. |
| 9,021,215 B2 | 4/2015 | Meir et al. |
| 9,025,393 B2 | 5/2015 | Wu et al. |
| 9,043,372 B2 | 5/2015 | Makkar et al. |
| 9,047,214 B1 | 6/2015 | Northcott |
| 9,053,808 B2 | 6/2015 | Sprouse et al. |
| 9,058,155 B2 | 6/2015 | Cepulis et al. |
| 9,063,895 B1 | 6/2015 | Madnani et al. |
| 9,063,896 B1 | 6/2015 | Madnani et al. |
| 9,098,211 B1 | 8/2015 | Madnani et al. |
| 9,110,898 B1 | 8/2015 | Chamness et al. |
| 9,110,964 B1 | 8/2015 | Shilane et al. |
| 9,116,819 B2 | 8/2015 | Cope et al. |
| 9,117,536 B2 | 8/2015 | Yoon et al. |
| 9,122,401 B2 | 9/2015 | Zaltsman et al. |
| 9,123,422 B2 | 9/2015 | Yu et al. |
| 9,124,300 B2 | 9/2015 | Sharon et al. |
| 9,134,908 B2 | 9/2015 | Horn et al. |
| 9,153,337 B2 | 10/2015 | Sutardja |
| 9,158,472 B2 | 10/2015 | Kesselman et al. |
| 9,159,422 B1 | 10/2015 | Lee et al. |
| 9,164,891 B2 | 10/2015 | Karamcheti et al. |
| 9,183,136 B2 | 11/2015 | Kawamura et al. |
| 9,189,650 B2 | 11/2015 | Jaye et al. |
| 9,201,733 B2 | 12/2015 | Verma et al. |
| 9,207,876 B2 | 12/2015 | Shu et al. |
| 9,229,656 B1 | 1/2016 | Contreras et al. |
| 9,229,810 B2 | 1/2016 | He et al. |
| 9,235,475 B1 | 1/2016 | Shilane et al. |
| 9,244,626 B2 | 1/2016 | Shah et al. |
| 9,250,999 B1 | 2/2016 | Barroso |
| 9,251,066 B2 | 2/2016 | Colgrove et al. |
| 9,268,648 B1 | 2/2016 | Barash et al. |
| 9,268,806 B1 | 2/2016 | Kesselman |
| 9,280,678 B2 | 3/2016 | Redberg |
| 9,286,002 B1 | 3/2016 | Karamcheti et al. |
| 9,292,214 B2 | 3/2016 | Kalos et al. |
| 9,298,760 B1 | 3/2016 | Li et al. |
| 9,304,908 B1 | 4/2016 | Karamcheti et al. |
| 9,311,969 B2 | 4/2016 | Sharon et al. |
| 9,311,970 B2 | 4/2016 | Sharon et al. |
| 9,323,663 B2 | 4/2016 | Karamcheti et al. |
| 9,323,667 B2 | 4/2016 | Bennett |
| 9,323,681 B2 | 4/2016 | Apostolides et al. |
| 9,335,942 B2 | 5/2016 | Kumar et al. |
| 9,348,538 B2 | 5/2016 | Mallaiah et al. |
| 9,355,022 B2 | 5/2016 | Ravimohan et al. |
| 9,384,082 B1 | 7/2016 | Lee et al. |
| 9,384,252 B2 | 7/2016 | Akirav et al. |
| 9,389,958 B2 | 7/2016 | Sundaram et al. |
| 9,390,019 B2 | 7/2016 | Patterson et al. |
| 9,395,922 B2 | 7/2016 | Nishikido et al. |
| 9,396,202 B1 | 7/2016 | Drobychev et al. |
| 9,400,828 B2 | 7/2016 | Kesselman et al. |
| 9,405,478 B2 | 8/2016 | Koseki et al. |
| 9,411,685 B2 | 8/2016 | Lee |
| 9,417,960 B2 | 8/2016 | Cai et al. |
| 9,417,963 B2 | 8/2016 | He et al. |
| 9,430,250 B2 | 8/2016 | Hamid et al. |
| 9,430,542 B2 | 8/2016 | Akirav et al. |
| 9,432,541 B2 | 8/2016 | Ishida |
| 9,454,434 B2 | 9/2016 | Sundaram et al. |
| 9,471,579 B1 | 10/2016 | Natanzon |
| 9,477,554 B2 | 10/2016 | Hayes et al. |
| 9,477,632 B2 | 10/2016 | Du |
| 9,501,398 B2 | 11/2016 | George et al. |
| 9,525,737 B2 | 12/2016 | Friedman |
| 9,529,542 B2 | 12/2016 | Friedman et al. |
| 9,535,631 B2 | 1/2017 | Fu et al. |
| 9,552,248 B2 | 1/2017 | Miller et al. |
| 9,552,291 B2 | 1/2017 | Munetoh et al. |
| 9,552,299 B2 | 1/2017 | Stalzer |
| 9,563,517 B1 | 2/2017 | Natanzon et al. |
| 9,588,698 B1 | 3/2017 | Karamcheti et al. |
| 9,588,712 B2 | 3/2017 | Kalos et al. |
| 9,594,652 B1 | 3/2017 | Sathiamoorthy et al. |
| 9,600,193 B2 | 3/2017 | Ahrens et al. |
| 9,619,321 B1 | 4/2017 | Haratsch et al. |
| 9,619,430 B2 | 4/2017 | Kannan et al. |
| 9,645,754 B2 | 5/2017 | Li et al. |
| 9,667,720 B1 | 5/2017 | Bent et al. |
| 9,710,535 B2 | 7/2017 | Aizman et al. |
| 9,733,840 B2 | 8/2017 | Karamcheti et al. |
| 9,734,225 B2 | 8/2017 | Akirav et al. |
| 9,740,403 B2 | 8/2017 | Storer et al. |
| 9,740,700 B1 | 8/2017 | Chopra et al. |
| 9,740,762 B2 | 8/2017 | Horowitz et al. |
| 9,747,319 B2 | 8/2017 | Bestler et al. |
| 9,747,320 B2 | 8/2017 | Kesselman |
| 9,767,130 B2 | 9/2017 | Bestler et al. |
| 9,781,227 B2 | 10/2017 | Friedman et al. |
| 9,785,498 B2 | 10/2017 | Misra et al. |
| 9,798,486 B2 | 10/2017 | Singh |
| 9,804,925 B1 | 10/2017 | Carmi et al. |
| 9,811,285 B1 | 11/2017 | Karamcheti et al. |
| 9,811,546 B1 | 11/2017 | Bent et al. |
| 9,818,478 B2 | 11/2017 | Chung |
| 9,829,066 B2 | 11/2017 | Thomas et al. |
| 9,836,245 B2 | 12/2017 | Hayes et al. |
| 9,891,854 B2 | 2/2018 | Munetoh et al. |

(56) References Cited

U.S. PATENT DOCUMENTS

| | | |
|---|---|---|
| 9,891,860 B1 | 2/2018 | Delgado et al. |
| 9,892,005 B2 | 2/2018 | Kedem et al. |
| 9,892,186 B2 | 2/2018 | Akirav et al. |
| 9,904,589 B1 | 2/2018 | Donlan et al. |
| 9,904,717 B2 | 2/2018 | Anglin et al. |
| 9,910,748 B2 | 3/2018 | Pan |
| 9,910,904 B2 | 3/2018 | Anglin et al. |
| 9,934,237 B1 | 4/2018 | Shilane et al. |
| 9,940,065 B2 | 4/2018 | Kalos et al. |
| 9,946,604 B1 | 4/2018 | Glass |
| 9,952,809 B2 | 4/2018 | Shah |
| 9,959,167 B1 | 5/2018 | Donlan et al. |
| 9,965,539 B2 | 5/2018 | D'Halluin et al. |
| 9,998,539 B1 | 6/2018 | Brock et al. |
| 10,007,457 B2 | 6/2018 | Hayes et al. |
| 10,013,177 B2 | 7/2018 | Liu et al. |
| 10,013,311 B2 | 7/2018 | Sundaram et al. |
| 10,019,314 B2 | 7/2018 | Yang et al. |
| 10,019,317 B2 | 7/2018 | Usvyatsky et al. |
| 10,031,703 B1 | 7/2018 | Natanzon et al. |
| 10,061,512 B2 | 8/2018 | Lin |
| 10,073,626 B2 | 9/2018 | Karamcheti et al. |
| 10,082,985 B2 | 9/2018 | Hayes et al. |
| 10,089,012 B1 | 10/2018 | Chen et al. |
| 10,089,174 B2 | 10/2018 | Yang |
| 10,089,176 B1 | 10/2018 | Donlan et al. |
| 10,108,819 B1 | 10/2018 | Donlan et al. |
| 10,146,787 B2 | 12/2018 | Bashyam et al. |
| 10,152,268 B1 | 12/2018 | Chakraborty et al. |
| 10,157,098 B2 | 12/2018 | Yang et al. |
| 10,162,704 B1 | 12/2018 | Kirschner et al. |
| 10,180,875 B2 | 1/2019 | Klein |
| 10,185,730 B2 | 1/2019 | Bestler et al. |
| 10,235,065 B1 | 3/2019 | Miller et al. |
| 10,324,639 B2 | 6/2019 | Seo |
| 10,567,406 B2 | 2/2020 | Astigarraga et al. |
| 10,846,137 B2 | 11/2020 | Vallala et al. |
| 10,846,275 B2 | 11/2020 | Hayes et al. |
| 10,877,683 B2 | 12/2020 | Wu et al. |
| 11,076,509 B2 | 7/2021 | Alissa et al. |
| 11,106,810 B2 | 8/2021 | Natanzon et al. |
| 11,194,707 B2 | 12/2021 | Stalzer |
| 2002/0103793 A1* | 8/2002 | Koller ............... G06F 16/24545 |
| 2002/0144059 A1 | 10/2002 | Kendall |
| 2003/0105984 A1 | 6/2003 | Masuyama et al. |
| 2003/0110205 A1 | 6/2003 | Johnson |
| 2004/0015478 A1* | 1/2004 | Pauly ............... G06F 16/2272 |
| 2004/0161086 A1 | 8/2004 | Buntin et al. |
| 2005/0001652 A1 | 1/2005 | Malik et al. |
| 2005/0076228 A1 | 4/2005 | Davis et al. |
| 2005/0235132 A1 | 10/2005 | Karr et al. |
| 2005/0256972 A1* | 11/2005 | Cochran ............... G06F 11/2071 709/245 |
| 2005/0278460 A1 | 12/2005 | Shin et al. |
| 2005/0283649 A1 | 12/2005 | Turner et al. |
| 2006/0015683 A1 | 1/2006 | Ashmore et al. |
| 2006/0114930 A1 | 6/2006 | Lucas et al. |
| 2006/0146199 A1* | 7/2006 | Kijak ............... G06V 20/40 348/700 |
| 2006/0174157 A1 | 8/2006 | Barrall et al. |
| 2006/0248294 A1 | 11/2006 | Nedved et al. |
| 2007/0079068 A1 | 4/2007 | Draggon |
| 2007/0214194 A1 | 9/2007 | Reuter |
| 2007/0214314 A1 | 9/2007 | Reuter |
| 2007/0234016 A1 | 10/2007 | Davis et al. |
| 2007/0244908 A1* | 10/2007 | Rajan ............... G06F 3/0635 |
| 2007/0268905 A1 | 11/2007 | Baker et al. |
| 2008/0005060 A1* | 1/2008 | Khalidi ............... G06F 9/44505 |
| 2008/0080709 A1 | 4/2008 | Michtchenko et al. |
| 2008/0107274 A1 | 5/2008 | Worthy |
| 2008/0152151 A1* | 6/2008 | Pourzandi ............... G06F 21/79 707/E17.005 |
| 2008/0155191 A1 | 6/2008 | Anderson et al. |
| 2008/0256141 A1 | 10/2008 | Wayda et al. |
| 2008/0295118 A1 | 11/2008 | Liao |
| 2009/0077208 A1 | 3/2009 | Nguyen et al. |
| 2009/0138654 A1 | 5/2009 | Sutardja |
| 2009/0216910 A1 | 8/2009 | Duchesneau |
| 2009/0216920 A1 | 8/2009 | Lauterbach et al. |
| 2010/0017444 A1 | 1/2010 | Chatterjee et al. |
| 2010/0042636 A1 | 2/2010 | Lu |
| 2010/0094806 A1 | 4/2010 | Apostolides et al. |
| 2010/0115070 A1 | 5/2010 | Missimilly |
| 2010/0125695 A1 | 5/2010 | Wu et al. |
| 2010/0162076 A1 | 6/2010 | Sim-Tang et al. |
| 2010/0169707 A1 | 7/2010 | Mathew et al. |
| 2010/0174576 A1 | 7/2010 | Naylor |
| 2010/0235362 A1* | 9/2010 | Cormode ............... G06F 16/20 707/E17.014 |
| 2010/0268908 A1 | 10/2010 | Ouyang et al. |
| 2010/0306500 A1 | 12/2010 | Mimatsu |
| 2011/0035540 A1 | 2/2011 | Fitzgerald et al. |
| 2011/0040925 A1 | 2/2011 | Frost et al. |
| 2011/0060927 A1 | 3/2011 | Fillingim et al. |
| 2011/0066577 A1* | 3/2011 | Van Gael ............... G06N 20/00 706/50 |
| 2011/0119462 A1 | 5/2011 | Leach et al. |
| 2011/0219170 A1 | 9/2011 | Frost et al. |
| 2011/0238625 A1 | 9/2011 | Hamaguchi et al. |
| 2011/0264843 A1 | 10/2011 | Haines et al. |
| 2011/0302369 A1 | 12/2011 | Goto et al. |
| 2012/0004111 A1* | 1/2012 | Colwell ............... G16B 50/30 506/8 |
| 2012/0011398 A1 | 1/2012 | Eckhardt et al. |
| 2012/0079318 A1 | 3/2012 | Colgrove et al. |
| 2012/0089567 A1 | 4/2012 | Takahashi et al. |
| 2012/0110249 A1 | 5/2012 | Jeong et al. |
| 2012/0131253 A1 | 5/2012 | McKnight et al. |
| 2012/0158923 A1 | 6/2012 | Mohamed et al. |
| 2012/0191900 A1 | 7/2012 | Kunimatsu et al. |
| 2012/0198152 A1 | 8/2012 | Terry et al. |
| 2012/0198261 A1 | 8/2012 | Brown et al. |
| 2012/0209943 A1 | 8/2012 | Jung |
| 2012/0226934 A1 | 9/2012 | Rao |
| 2012/0246435 A1 | 9/2012 | Meir et al. |
| 2012/0260055 A1 | 10/2012 | Murase |
| 2012/0303627 A1 | 11/2012 | Keeton et al. |
| 2012/0311557 A1 | 12/2012 | Resch |
| 2013/0022201 A1 | 1/2013 | Glew et al. |
| 2013/0036314 A1 | 2/2013 | Glew et al. |
| 2013/0042056 A1 | 2/2013 | Shats et al. |
| 2013/0060884 A1 | 3/2013 | Bernbo et al. |
| 2013/0067188 A1 | 3/2013 | Mehra et al. |
| 2013/0073894 A1 | 3/2013 | Xavier et al. |
| 2013/0124776 A1 | 5/2013 | Hallak et al. |
| 2013/0132800 A1 | 5/2013 | Healey, Jr. et al. |
| 2013/0151653 A1 | 6/2013 | Sawicki et al. |
| 2013/0151771 A1 | 6/2013 | Tsukahara et al. |
| 2013/0173853 A1 | 7/2013 | Ungureanu et al. |
| 2013/0238554 A1 | 9/2013 | Yucel et al. |
| 2013/0318101 A1* | 11/2013 | Chen ............... G06F 16/3323 707/748 |
| 2013/0339314 A1 | 12/2013 | Carpentier et al. |
| 2013/0339635 A1 | 12/2013 | Amit et al. |
| 2013/0339818 A1 | 12/2013 | Baker et al. |
| 2014/0040535 A1 | 2/2014 | Lee et al. |
| 2014/0040702 A1 | 2/2014 | He et al. |
| 2014/0041047 A1 | 2/2014 | Jaye et al. |
| 2014/0047263 A1 | 2/2014 | Coatney et al. |
| 2014/0047269 A1 | 2/2014 | Kim |
| 2014/0063721 A1 | 3/2014 | Herman et al. |
| 2014/0064048 A1 | 3/2014 | Cohen et al. |
| 2014/0067767 A1 | 3/2014 | Ganesh et al. |
| 2014/0068224 A1 | 3/2014 | Fan et al. |
| 2014/0075252 A1 | 3/2014 | Luo et al. |
| 2014/0122510 A1 | 5/2014 | Namkoong et al. |
| 2014/0136880 A1 | 5/2014 | Shankar et al. |
| 2014/0181402 A1 | 6/2014 | White |
| 2014/0201132 A1* | 7/2014 | Konik ............... G06F 16/23 707/609 |
| 2014/0220561 A1 | 8/2014 | Sukumar et al. |
| 2014/0237164 A1 | 8/2014 | Le et al. |
| 2014/0279936 A1 | 9/2014 | Bernbo et al. |
| 2014/0280025 A1 | 9/2014 | Eidson et al. |

(56) References Cited

U.S. PATENT DOCUMENTS

| | | |
|---|---|---|
| 2014/0289588 A1 | 9/2014 | Nagadomi et al. |
| 2014/0330785 A1 | 11/2014 | Isherwood et al. |
| 2014/0372838 A1 | 12/2014 | Lou et al. |
| 2014/0380125 A1 | 12/2014 | Calder et al. |
| 2014/0380126 A1 | 12/2014 | Yekhanin et al. |
| 2015/0032701 A1* | 1/2015 | Lyle .................. G06F 16/2228 707/690 |
| 2015/0032720 A1 | 1/2015 | James |
| 2015/0039645 A1 | 2/2015 | Lewis |
| 2015/0039849 A1 | 2/2015 | Lewis |
| 2015/0089283 A1 | 3/2015 | Kermarrec et al. |
| 2015/0100746 A1 | 4/2015 | Rychlik et al. |
| 2015/0134824 A1 | 5/2015 | Mickens et al. |
| 2015/0153800 A1 | 6/2015 | Lucas et al. |
| 2015/0154418 A1 | 6/2015 | Redberg |
| 2015/0180714 A1 | 6/2015 | Chunn et al. |
| 2015/0280959 A1 | 10/2015 | Vincent |
| 2016/0026397 A1 | 1/2016 | Nishikido et al. |
| 2016/0182542 A1 | 6/2016 | Staniford |
| 2016/0191508 A1 | 6/2016 | Bestler et al. |
| 2016/0246537 A1 | 8/2016 | Kim |
| 2016/0248631 A1 | 8/2016 | Duchesneau |
| 2016/0314148 A1* | 10/2016 | Chirayath ........... G06F 16/1727 |
| 2016/0378612 A1 | 12/2016 | Hipsh et al. |
| 2017/0091236 A1 | 3/2017 | Hayes et al. |
| 2017/0103092 A1 | 4/2017 | Hu et al. |
| 2017/0103094 A1 | 4/2017 | Hu et al. |
| 2017/0103098 A1 | 4/2017 | Hu et al. |
| 2017/0103116 A1 | 4/2017 | Hu et al. |
| 2017/0177236 A1 | 6/2017 | Haratsch et al. |
| 2017/0262202 A1 | 9/2017 | Seo |
| 2018/0039442 A1 | 2/2018 | Shadrin et al. |
| 2018/0054454 A1 | 2/2018 | Astigarraga et al. |
| 2018/0081958 A1 | 3/2018 | Akirav et al. |
| 2018/0101441 A1 | 4/2018 | Hyun et al. |
| 2018/0101587 A1 | 4/2018 | Anglin et al. |
| 2018/0101588 A1 | 4/2018 | Anglin et al. |
| 2018/0217756 A1 | 8/2018 | Liu et al. |
| 2018/0307560 A1 | 10/2018 | Vishnumolakala et al. |
| 2018/0321874 A1 | 11/2018 | Li et al. |
| 2019/0036703 A1 | 1/2019 | Bestler |
| 2019/0220315 A1 | 7/2019 | Vallala et al. |
| 2020/0034560 A1 | 1/2020 | Natanzon et al. |
| 2020/0326871 A1 | 10/2020 | Wu et al. |
| 2021/0073193 A1 | 3/2021 | Hayes et al. |
| 2021/0360833 A1 | 11/2021 | Alissa et al. |

FOREIGN PATENT DOCUMENTS

| | | |
|---|---|---|
| WO | 0213033 A1 | 2/2002 |
| WO | 2008103569 A1 | 8/2008 |
| WO | 2008157081 A2 | 12/2008 |
| WO | 2013032825 A2 | 3/2013 |

OTHER PUBLICATIONS

International Search Report and Written Opinion, PCT/US2015/018169, May 15, 2015, 10 pages.
International Search Report and Written Opinion, PCT/US2015/034291, Sep. 30, 2015, 3 pages.
International Search Report and Written Opinion, PCT/US2015/034302, Sep. 11, 2015, 10 pages.
International Search Report and Written Opinion, PCT/US2015/039135, Sep. 18, 2015, 8 pages.
International Search Report and Written Opinion, PCT/US2015/039136, Sep. 23, 2015, 7 pages.
International Search Report and Written Opinion, PCT/US2015/039137, Oct. 1, 2015, 8 pages.
International Search Report and Written Opinion, PCT/US2015/039142, Sep. 24, 2015, 3 pages.
International Search Report and Written Opinion, PCT/US2015/044370, Dec. 15, 2015, 3 pages.
International Search Report and Written Opinion, PCT/US2016/014356, Jun. 28, 2016, 3 pages.
International Search Report and Written Opinion, PCT/US2016/014357, Jun. 29, 2016, 3 pages.
International Search Report and Written Opinion, PCT/US2016/014361, May 30, 2016, 3 pages.
International Search Report and Written Opinion, PCT/US2016/014604, May 19, 2016, 3 pages.
International Search Report and Written Opinion, PCT/US2016/016504, Jul. 6, 2016, 7 pages.
International Search Report and Written Opinion, PCT/US2016/023485, Jul. 21, 2016, 13 pages.
International Search Report and Written Opinion, PCT/US2016/024391, Jul. 12, 2016, 11 pages.
International Search Report and Written Opinion, PCT/US2016/026529, Jul. 19, 2016, 9 pages.
International Search Report and Written Opinion, PCT/US2016/031039, Aug. 18, 2016, 7 pages.
International Search Report and Written Opinion, PCT/US2016/033306, Aug. 19, 2016, 11 pages.
International Search Report and Written Opinion, PCT/US2016/047808, Nov. 25, 2016, 14 pages.
Kim et al., "Data Access Frequency based Data Replication Method using Erasure Codes in Cloud Storage System", Journal of the Institute of Electronics and Information Engineers, Feb. 2014, vol. 51, No. 2, 7 pages.
Schmid, "RAID Scaling Charts, Part 3:4-128 KB Stripes Compared", Tom's Hardware, Nov. 27, 2007, URL: http://www.tomshardware.com/reviews/RAID-SCALING-CHARTS.1735-4.html, 24 pages.
Stalzer, "FlashBlades: System Architecture and Applications", Proceedings of the 2nd Workshop on Architectures and Systems for Big Data, Jun. 2012, pp. 10-14, Association for Computing Machinery, New York, NY.
Storer et al., "Pergamum: Replacing Tape with Energy Efficient, Reliable, Disk-Based Archival Storage", FAST'08: Proceedings of the 6th USENIX Conference on File and Storage Technologies, Article No. 1, Feb. 2008, pp. 1-16, USENIX Association, Berkeley, CA.

* cited by examiner

PROBALISTIC DATA STRUCTURE FOR KEY MANAGEMENT

CROSS REFERENCE TO RELATED APPLICATIONS

This is a continuation application for patent entitled to a filing date and claiming the benefit of earlier-filed U.S. patent application Ser. No. 16/953,213, filed Nov. 19, 2020, which is a continuation of U.S. Pat. No. 10,846,275, issued Nov. 24, 2020, each of which is hereby incorporated by reference in their entirety.

BACKGROUND

Data storage systems store and manage large amounts of data. Keys are used in some data storage systems, pointing to, referencing, or in association with data, to make handling and keeping track of data more manageable and efficient. There may be large numbers of keys, duplicate keys, and/or keys with differing functions and usages in single or multiple locations, for example within differing servers, in a storage system. Communication regarding keys, and management of large numbers of keys, could consume a large amount of communication bandwidth and computing resources, diminishing the efficiency gains brought about by the use of keys. Recovery of storage memory and other system resources may be delayed, or performed at lowered efficiency when one part of a storage system is not aware that another part of the storage system maintains deleted keys.

It is within this context that the embodiments arise.

SUMMARY

In some embodiments, a method for deleting a set of keys from a storage server is provided. The method includes generating a probabilistic data structure for a first set of keys and for each key in a second set of keys, determining whether a key of the second set of keys is found in the probabilistic data structure. The method includes identifying the key as a candidate for deletion if the key is not found in the probabilistic data structure.

In some embodiments, a storage system is provided. The system includes memory, configured to hold data and metadata, including keys that identify data and keys associated with data and one or more processors, configured to perform actions. The actions include storing data, metadata, the keys associated with data, and the keys that identify data in the memory and deleting one or more of the keys that identify data, when no longer needed. The method includes producing a probabilistic data structure based on a first set of the keys, the probabilistic data structure configured to determine whether a key tested with the probabilistic data structure is a member of the first set of keys. For keys in a second set of keys stored in the storage system, the actions include determining whether a key of the second set of keys is found in the probabilistic data structure and identifying a key from the second set of keys as a candidate for deletion responsive to the determining finding that the key is not a member of the first set of keys.

In some embodiments, a storage system is provided. The system includes memory and one or more processors, configured to store, in the memory, data, metadata, keys associated with one of the data and the metadata and further configured to delete one or more of the keys. The system includes a data structure generator configured to derive a probabilistic data structure from a first set of keys that identify data such that the probabilistic data structure declares, for a query for a key, what the likelihood of membership of the key is in the first set of keys. The system includes a key query engine configured to query for each key in a second set of keys using the probabilistic data structure derived from the first set of keys and a resource recovery engine configured to identify as candidates for deletion a subset of keys from the second set of keys, responsive to results of the key query engine indicating each key of the subset of keys is definitely not a member of the first set of keys.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A storage system as disclosed herein uses probabilistic data structures for the management of keys. In various operations, the storage system creates keys, manages keys, and deletes keys. To communicate in a compact manner regarding existence or nonexistence of keys in one part of the system, so that other parts of the system can delete unneeded keys, and recover storage memory and other system resources, the system generates probabilistic data structures. Storage servers or nodes in the storage system can test keys, using a probabilistic data structure, to determine whether a key is a candidate for deletion. In some embodiments, a key selector is applied to filter a set of keys prior to the generation of a probabilistic data structure, and a key selector is applied to filter another set of keys prior to the testing of keys. Probabilistic data structures can be merged in some embodiments. Discarding of keys can be postponed, pending system conditions. Components or modules for probabilistic data structures can be located in various parts of the storage system, such as in one or more metadata servers or one or more storage servers, or elsewhere in the system.

Figure 1:
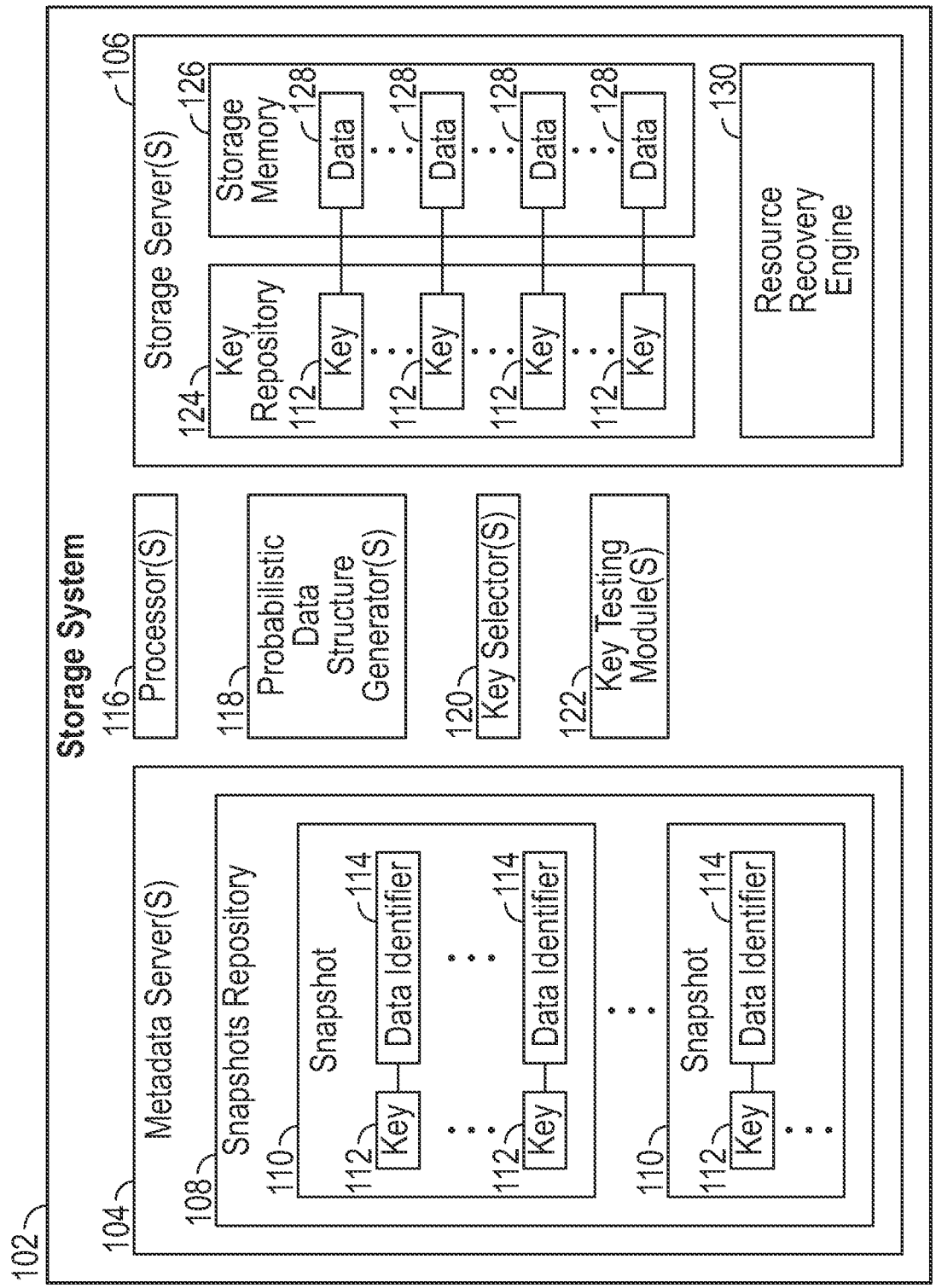
FIG. 1 is a system diagram of a storage system that generates and uses probabilistic data structures for deletion of keys, in accordance with some embodiments of the present disclosure.

FIG. 1 is a system diagram of a storage system 102 that generates and uses probabilistic data structures for deletion of keys 112, in accordance with an embodiment. Keys 112 are used in one or more metadata servers 104, to identify data 128. Further keys 112 are used in one or more storage servers 106, in association with data 128 in storage memory 126. It should be appreciated that, although embodiments are described herein in specific ways keys 112 are used and associated with data 128 in embodiments of the storage system 102, the teachings regarding use of probabilistic data structures are readily generalized to further uses of keys 112 in various storage systems and elsewhere. That is, the embodiments may be extended to any system utilizing or managing keys as described herein. In addition, these teachings are applicable to metadata servers 104 and storage servers 106, whether implemented as logical constructs (e.g., in software executing on hardware), firmware, hardware, or combinations thereof.

The storage system 102 has keys 112, which identify files or other data 128, on a metadata server 104. It should be appreciated that over time previously valid keys 112 can be deleted from the metadata server 104. At various points in time, one or more storage servers 106 should be notified, so that the storage server(s) 106 can delete keys 112 that are no longer valid on the metadata server 104 and release resources associated with those keys 112. The storage system 112 accomplishes this task efficiently, with the use of probabilistic data structures, such as a Bloom filter in one embodiment. In other embodiments, probabilistic data structures other than a Bloom filter such as a HyperLogLog, count-min sketch, skip lists, etc. may be utilized with the embodiments described below.

The storage system 102 inserts a valid set of keys into a probabilistic data structure, and sends the probabilistic data structure (e.g., a filter) to one or more storage servers 106. A storage server 106 receiving such a probabilistic data structure is then able to analyze the set of keys 112 that the storage server 106 is presently storing, and deleting or considering for deletion any key 112 not found in the probabilistic data structure. This approach deletes keys 112 from the storage server 106 that are not present on the original metadata server 104, although some keys not present on the original metadata server 104 might survive on a storage server 106 as a result of collisions (false positives) in the probabilistic data structure.

The storage system 102 has one or more processors 116, which could be distributed through or employed by one or more metadata servers 104 and/or one or more storage servers 106. One or more probabilistic data structure generators 118, described in more detail below with reference to FIG. 2, could be in one or more metadata servers 104, in one or more storage servers 106 and/or elsewhere in the storage system 102. Some embodiments have one or more key selectors 120, which are further described below with reference to FIG. 5. One or more key testing modules 122, described below with reference to FIG. 3, could reside in one or more storage servers 106 or elsewhere in the storage system 102. In the example shown in FIG. 1, the metadata server(s) 104 have a snapshots repository 108, which is used for snapshots 110 of data 128 as stored in the storage server(s) 106. Each snapshot has multiple keys 112, each associated with a respective data identifier 114. A snapshot thus points to various data 128 in storage memory 126 of storage server(s) 106, using keys 112 and associated data identifiers 114. In a variation, the metadata server(s) 104 could use keys 112 and data identifiers 114 for backup images. Other uses of keys 112 in metadata server(s) 104 are readily devised as FIG. 1 is meant to be one example and not limiting.

Still referring to FIG. 1, the storage server(s) 106 store keys 112 in a key repository 124. Each key 112 is associated with data 128 in the storage memory 126 of the storage server(s) 106. For example, when storing a particular piece of data 128, a storage server 106 could store the data 128 in storage memory 126 and store an associated key 112 in the key repository 124. In various embodiments, a key repository 124 could be common across multiple storage servers 106, or each storage server 106 could have a key repository 124. Storage memory 126 could be centralized or distributed across storage servers 106, and data could be stored with or without encryption, with or without error correction code, or redundancy, etc. In some embodiments, the key repository 124 is in the storage memory 126.

In one operating scenario, the storage system 102 stores data 128 in the storage server(s) 106 (i.e., in the storage memory 126), and takes snapshots 110, which the metadata server(s) 104 store in one or more snapshots repositories 108. When a metadata server 104 deletes a snapshot 110, the keys 112 of that snapshot 110 are deleted. The metadata server(s) 104, or some other part of the storage system 102, can communicate to the storage server(s) 106 as to which of the keys are still valid and exist in the snapshots repository(s) 108, by using the probabilistic data structure generator(s) 118, as further described below. In turn, the storage server(s) 106 can use one or more probabilistic data structures, as generated by the probabilistic data structure generator(s) 118, and one or more key testing modules 122 (also referred to as a key query engine) to determine which keys 112 held by the storage server(s) 106 are candidates for deletion. Upon deletion of keys 112, the storage server(s) 106 can recover storage memory 126 and other system resources formerly used by the data 128 associated with the deleted keys 112. In some embodiments, a storage server 106 has a resource recovery engine 130, which performs resource recovery. One or more key selectors 120 are used to filter the keys 112 at both ends of these processes, for more efficient key handling in some embodiments.

Figure 2:
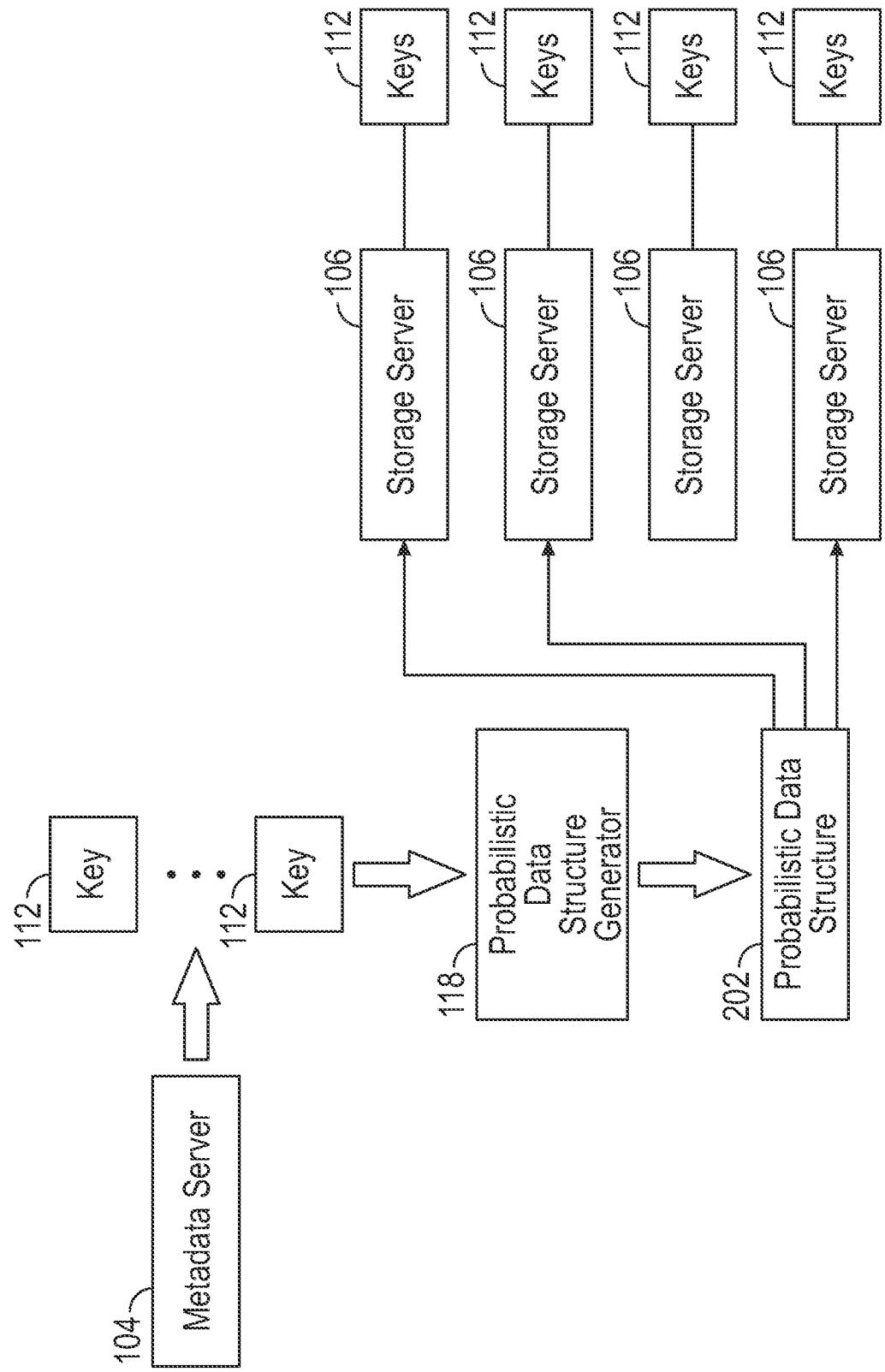
FIG. 2 is an action diagram showing operation of the probabilistic data structure generator of FIG. 1, and distribution of probabilistic data structures in accordance with some embodiments.

FIG. 2 is an action diagram showing operation of the probabilistic data structure generator 118 of FIG. 1, and distribution of probabilistic data structures 202. The metadata server 104 provides keys 112, for example in a list, a series of messages or other communications, or access to snapshot(s) 110, to a probabilistic data structure generator 118. The probabilistic data structure generator 118 could be implemented as a software module executing on one or more of the processors 116 (see FIG. 1), in firmware or in hardware, or combinations thereof, and could exist as a single entity used by multiple metadata servers 104, or each metadata server 104 could have probabilistic data structure generator 118. Bloom filters are one suitable probabilistic data structure 202, but other data structures could be used. Selection of a type of probabilistic data structure 202, and programming or logic for the probabilistic data structure generator 118, are implementation specific. Probabilistic data structures generally, and Bloom filters specifically, are compact representations. For example, a set of keys 112 could have 32 bytes per key 112 while a Bloom filter with better than 1% accuracy might have less than one byte per key 112 represented in the Bloom filter in some embodiments. Consequently, sending a probabilistic data structure 202 from one location in a storage system 102 to one or more further locations in the storage system 102, or providing access to the probabilistic data structure 202, consumes less communication bandwidth and system resources than would sending a list of all of the keys 112 in a set.

Based on the keys 112 fed into the probabilistic data structure generator 118, the probabilistic data structure generator outputs a probabilistic data structure 202 that has properties useful to the storage system 102. A Bloom filter constructed for members of a set has the property that testing whether an element is a member of the set, by querying that Bloom filter, yields either the answer that the element is definitively not in the set, or the answer that the element is possibly or likely in the set. Bloom filters can be tuned to affect the accuracy of the positive (i.e., possible or likely membership) answers, and a larger Bloom filter has generally a greater accuracy for a given set of keys. Larger Bloom filters are typically more accurate than smaller ones, all other things being equal. False positives are possible, in that the Bloom filter has a low probability of reporting an element is a member of a set when in fact it is not. However, false negatives are not possible, in that the Bloom filter never reports that an element is not a member of the set when in fact it is. This property makes the Bloom filter one suitable type of probabilistic data structure 202 generated by the probabilistic data structure generator 118. As noted above alternative probabilistic data structures besides a Bloom filter may be integrated into the embodiments. The storage system 102 can reliably delete or consider for deletion, a key 112 that a Bloom filter says is not in the set of keys 112 for which the Bloom filter was constructed, without concern for deleting a key 112 and associated data 128 in a storage server 106 when the key 112 is still valid in a metadata server 104 and therefore needed in a storage server 106.

In some embodiments, the storage system 102, or the metadata server 104 originating a probabilistic data structure 202, can send the probabilistic data structure 202 to one storage server 106, multiple storage servers 106, or all of the storage servers 106 in the storage system 102. Selection of which storage server(s) 106 are destinations for a specific probabilistic data structure 202 is situation dependent. For example, a metadata server 104 that is deleting keys 112 of a specific one or more snapshots that were performed on data in one or more specific storage servers 106 could generate a probabilistic data structure 202 based on remaining keys 112 in that metadata server 104 and send that probabilistic data structure 202 to the one or more specific storage servers 106. Those specific storage servers 106 could then apply that probabilistic data structure 202 in order to determine which keys 112 should be considered for deletion. The metadata server 104 would not need to send that probabilistic data structure 202 to other storage servers 106. In some embodiments, in order to improve efficiency of distribution of probabilistic data structures 202, the metadata server(s) 104 track storage servers 106 when making snapshots, or backups, or performing other tasks involving keys 112. This supports classifying or grouping which probabilistic data structure 202 goes to which storage server 106. For example, if a metadata server 104 is aware that none of the keys 112 represented in a probabilistic data structure 202 are on a specific storage server 106, then the metadata server 104 does not need to send that probabilistic data structure 202 to that storage server 106. In the alternative, if the metadata server 104 knows that some of the keys 112 represented in a probabilistic data structure 202 are on a specific storage server 106, then the metadata server 104 could send the probabilistic data structure 202 to the storage server 106. This applies to multiple metadata servers 104, and multiple storage servers 106, and further applies to merged probabilistic data structures 202, as will be described with reference to FIG. 4.

Figure 3:
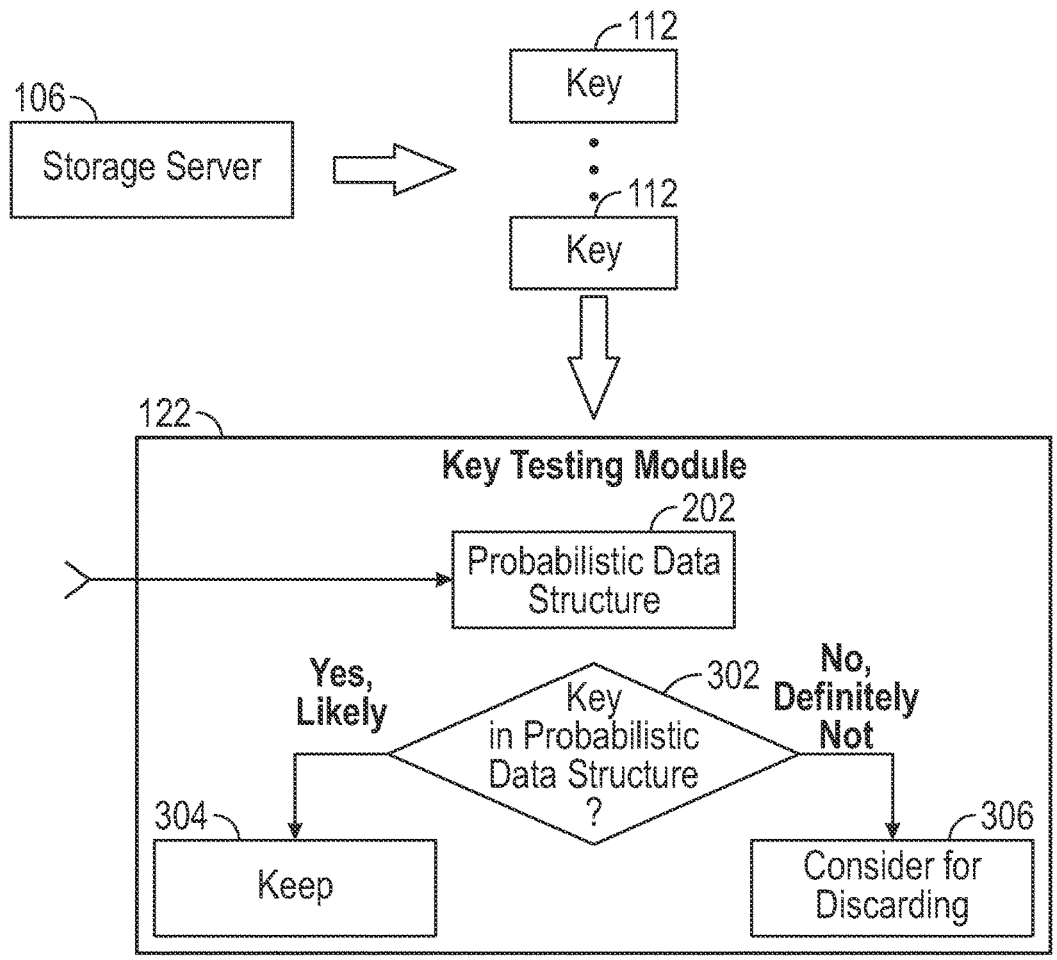
FIG. 3 is an action diagram showing operation of the key testing module of FIG. 1, determining whether to keep or discard keys based on testing the keys with a probabilistic data structure in accordance with some embodiments.

FIG. 3 is an action diagram showing operation of the key testing module 122 of FIG. 1, determining whether to keep or discard keys 112 based on testing the keys with a probabilistic data structure 202. The key testing module 122 is being used by or on behalf of one or more storage servers 106, which are storing keys 112 in association with data 128 in a storage memory 126. In various embodiments, each storage server 106 could have a key testing module 122, or one or more key testing modules 122 could be shared by one or more storage servers 106, etc. The storage server 106 provides keys 112 to the key testing module 122, which tests the keys 112 using the probabilistic data structure 202, e.g., as obtained from a metadata server 104. A decision action 302 in the key testing module 122 determines whether the key 112 is found in the probabilistic data structure 202. If the answer in the decision action 302 is yes, it is likely that the key 112 is in the probabilistic data structure 202 (see properties of the probabilistic data structure, as discussed regarding FIG. 2), the action 304 is performed, to keep the key 112, i.e., to not discard the key 112. If the answer in the decision action 302 is no, the key 112 is not found in the probabilistic data structure 202, the action 306 is performed, to consider the key 112 for discarding.

Referring to FIGS. 1-3, in some embodiments, the metadata server 104 is communicating to the storage server 106 that the probabilistic data structure 202 indicates which keys 112 are valid on the metadata server 104, and provides permission to the storage server 106 to delete any keys 112 that are not valid on the metadata server 104. The storage server 106 further has permission to recover some of the storage memory 126. It should be appreciated that this mechanism works even with keys with different structures, or different types of keys, in the same probabilistic data structure 202. For example, some keys could relate to directory structure and/or snapshot epoch, other keys could relate to files. Some embodiments use hash functions for keys 112, e.g., by applying a hash function to subject matter to create a key 112.

Figure 4:
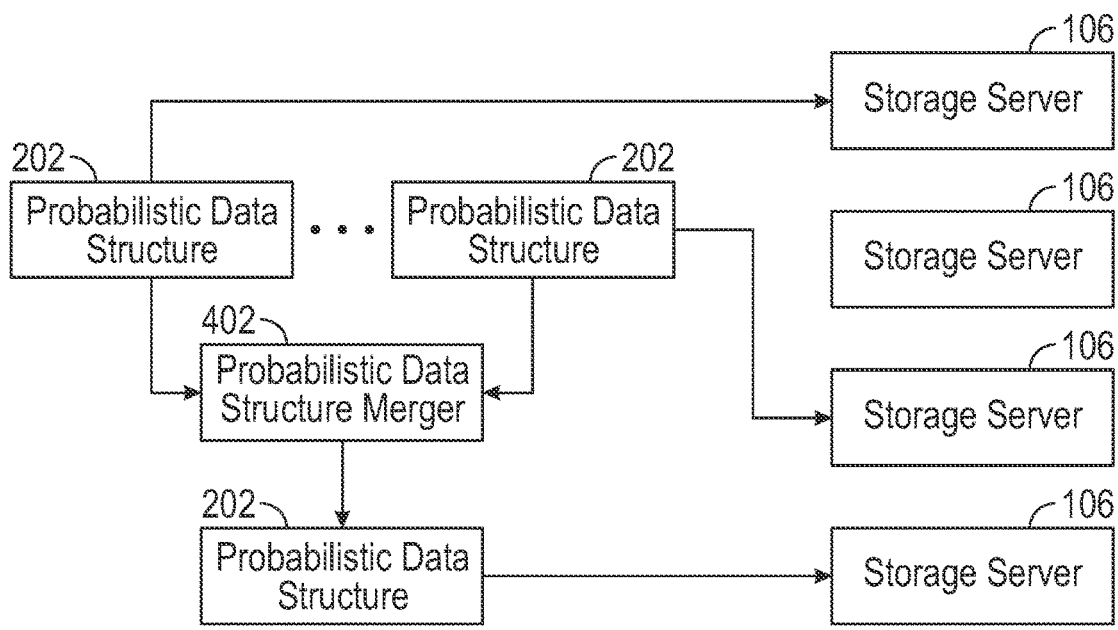
FIG. 4 depicts a probabilistic data structure merger in accordance with some embodiments.

FIG. 4 depicts a probabilistic data structure merger 402. There are known techniques associated with merging skip lists and that steps of that method would be different than that of a Bloom Filter. For example, if the probabilistic data structures 202 are Bloom filters, two or more Bloom filters can be logical ORed together to merge them into one Bloom filter. The two or more Bloom filters are identical in size, and generated with identical hash functions in some embodiments. There may be an exception if one Bloom filter is exactly N times as big as another, and they use the same hash functions. In such a case, N bits in the larger Bloom filter correspond to a single bit in the smaller one, and a merged filter the size of the smaller one can be generated by ORing together the N bits of the larger one with the corresponding single bit in the smaller one. The merged probabilistic data structure 202 can be sent to one or more specific storage servers 106, as can one or more of the originating probabilistic data structures 202. A merged probabilistic data structure 202, in this embodiment, has the property of reporting that a key 112 that is definitely not found in each of the originating probabilistic data structures 202 is also definitely not found in the merged probabilistic data structure 202. Relatedly, the merged data structure 202 will report that a key that is likely found in one (or both) of the originating probabilistic data structures 202 is also likely found in the merged probabilistic data structure 202. As with the scenario described with reference to FIG. 2, operation of the probabilistic data structure merger 402 and distribution of one or more probabilistic data structures 202 to one or more storage servers 106 is situation dependent. For example, a metadata server 104 that has created two probabilistic data structures 202 after multiple key deletion operations could merge the two probabilistic data structures 202 as described above. The metadata server 104 could then send one probabilistic data structure 202 to a specific storage server 106 for which that probabilistic data structure 202 is relevant, another probabilistic data structure 202 to another storage server 106 as relevant, and the merged probabilistic data structure 202 to yet another storage server 106 for which that merged probabilistic data structure 202 is relevant. Differing merged combinations of probabilistic data structures 202 could be applied at differing locations within the storage system 102. Many permutations of the above are possible. Each storage server 106 tests keys 112 with the probabilistic data structure 202 that is received by that storage server 106.

Figure 5:
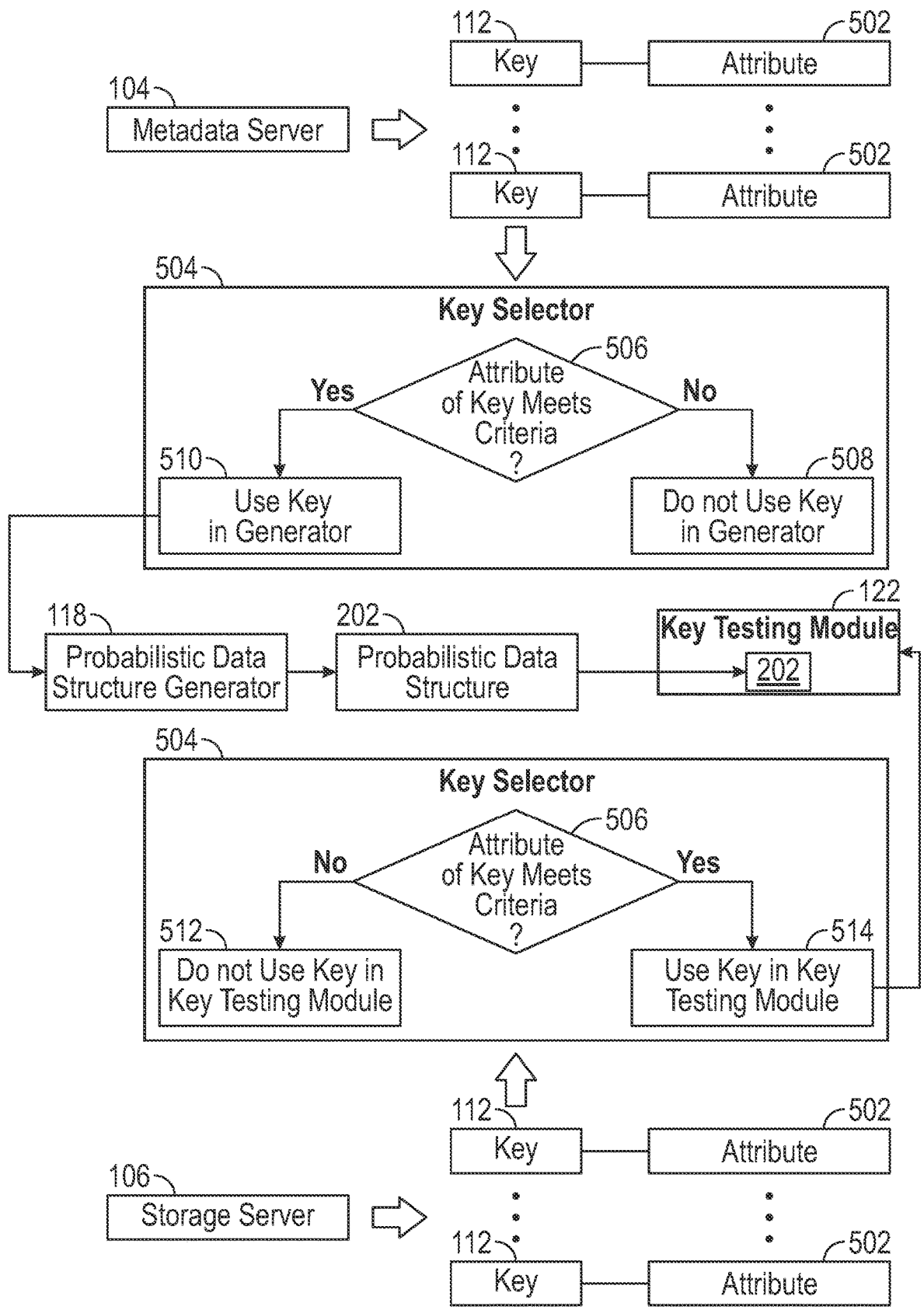
FIG. 5 is an action diagram showing operation of key selectors filtering keys for the probabilistic data structure generator, and filtering keys for the key testing module in accordance with some embodiments.

FIG. 5 is an action diagram showing operation of key selectors 504 filtering keys 112 for the probabilistic data structure generator 118, and filtering keys 112 for the key testing module 122. This mechanism improves upon the process of using a probabilistic data structure 202 for consideration of key deletion, in that the set of keys 112 inserted into the probabilistic data structure 202 is constrained. Constraining the keys 112 used in generating a probabilistic data structure 202, and similarly constraining the keys 112 tested with the probabilistic data structure 202 for consideration of deletion, reduces the number of keys so applied and improves efficiency of the system in some embodiments. A key selector 504 could be implemented as a software module, with programming executing on one or more processors 116 of the storage system 102, firmware, hardware, or combinations thereof. Use of key selectors 504 is paired or coordinated between one or more metadata servers 104 and one or more storage servers 106, for greater efficiency of the storage system 102. In some embodiments, each metadata server 104 and each storage server 106 has a key selector 504, and in further embodiments one or more key selectors 504 are shared across various resources. By applying an attribute 502 of a key 112 in a process of selecting keys 112, the storage system 102 can filter out keys 112 that are not relevant for production and usage of a specific probabilistic data structure 202. The attribute 502 could be part of a key 112, or could be an attribute 502 that is separate from the key 112 but otherwise associated.

For example, the attribute 502 could be a value of an epoch (e.g., a specific time or time span, which may or may not be related in a straightforward manner to wall-clock time or calendar dates) for one or more snapshots. The key selector 504 would select which keys 112 belong to that epoch, for generation of a specific probabilistic data structure 202. The same or another key selector 504 would select keys 112 belonging to that same epoch, for use in a key testing module 122 equipped with the same probabilistic data structure 202, e.g., as received from a metadata server 104. By using one or more key selectors 504 in this manner, the storage system 102 can more efficiently generate and use a probabilistic data structure 202, without having to put irrelevant keys 112 into the probabilistic data structure generator 112 or the key testing module 122.

Continuing with reference to FIG. 5, functioning of one or more key selectors 504 starts with one or more metadata servers 104 providing keys 112 that have or are associated with attributes 502. The metadata server 104 communicates criteria to the key selector 504 and also to the storage server 106, or the storage server 106 reuses the same key selector 504 with the same criteria, in various embodiments. In a further embodiment, the one or more key selectors 504 can determine the criteria, e.g., by looking up a parameter or coordinating with the metadata server 104 and/or the storage server 106, etc. The key selector 504 performs a decision action 506, to determine whether the attribute or attributes 504 of the key 112 meets the criteria, for each key 112 provided to the key selector 504. For example, a function could be applied to one or more attributes that deterministically provides a yes or no answer based on the attribute(s). If the answer to the decision action 506 is no, the attribute(s) 502 of the key 112 does not meet the criteria then the resulting action 508 is to not use the key 112 in the probabilistic data structure generator 118. If the answer to the decision action 506 is yes, the attribute(s) 502 of the key 112 does meet the criteria, then the action 510 is to use that key 112 in the probabilistic data structure generator 118. Using only the selected keys 112, the probabilistic data structure generator 118 forms the probabilistic data structure 202, which corresponds only to the selected keys 112 having the attribute(s) 502 that meet the criteria. The resultant probabilistic data structure 202 is used in the key testing module 122. For example, the metadata server 104 could send the probabilistic data structure 202 to a storage server 106 that is using the key testing module 122.

The storage server 106 provides keys 112 that have or are associated with attributes 502, to the same or another key selector 504. The key selector 504 performs a decision action 506, to determine whether the attribute(s) 504 of the key 112 meets the criteria, for each key 112 provided to the key selector 504. If the answer to the decision action 506 is no, the attribute(s) 502 of the key 112 does not meet the criteria then the resulting action 512 is to not use the key 112 in the key testing module 122. If the answer to the decision action 506 is yes, the attribute(s) 502 of the key 112 does meet the criteria, then the action 514 is to use that key 112 in the key testing module 122. Some embodiments employ a key selector 504 as a filter prior to the probabilistic data structure generator 118, some embodiments employ a key selector 504 as a filter prior to the key testing module 122, some embodiments employ both, and some embodiments employ neither. In some embodiments, the storage server 106 does not consider any keys 112 that would not have been included in the probabilistic data structure 202 created by the metadata server 104 and the probabilistic data structure generator 118 in order to avoid deleting a key that is still valid.

Figure 6:
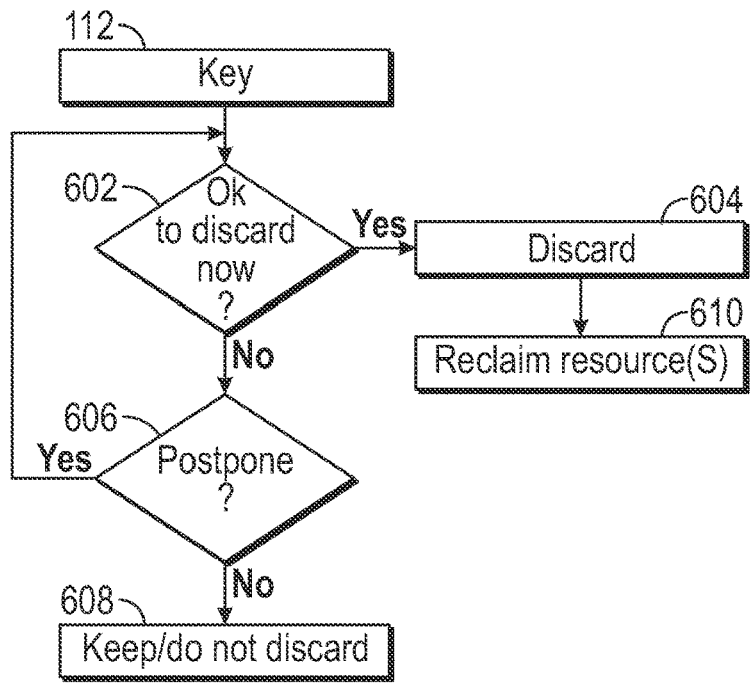
FIG. 6 is an action diagram showing keys as candidates for discarding, with a decision for discarding, postponement, or not discarding in accordance with some embodiments.

FIG. 6 is an action diagram showing keys 112 as candidates for discarding, with a decision 602 for discarding, postponement, or not discarding. This could be implemented in software executing on one or more processors, e.g., as a software module, or firmware or hardware, or combinations thereof. A key 112, in this scenario, has been determined by the key testing module to be a candidate for discarding (e.g., as in the action 306 in FIG. 3). The decision action 602 determines whether it is okay to discard the key 112. For example, the decision action 602 could consider system state or constraints, such as that the system is too busy, a metadata server 104 is busy, a storage server 106 is busy, or the system resource or time cost to discard keys 112 at the present time would be too great and would result in undesirable or unacceptable delays in data access time or other system operation, etc. The system could consider one or more predetermined conditions in the decision action 602, such as whether a storage server 106 is in a resource recovery mode (e.g., not "too busy"), a data read or data write mode (e.g., "too busy"), or is not currently reading or writing data (e.g., not "too busy"). Other predetermined conditions to consider could include whether a storage memory is involved in read or write access (e.g., "too busy") or a backup run or snapshot is in progress (e.g., "too busy"), or the system is otherwise idle and/or performing background tasks, or not. Yet another predetermined condition to consider would be whether the number of keys 112 under consideration for deletion is less than, equal to or greater than a predetermined number, as deleting a large number of keys 112 could be considered an expensive deletion in terms of system resources or time cost. A time-slicing, multi-tasking, task bandwidth or other time or task-related algorithm could be applied, with status relative to this algorithm being a predetermined condition for consideration. In some embodiments deletion requests could be batched, since it could be easier to delete a large number of keys 112 at one time rather than deleting keys 112 individually on demand. Discarding of one or more keys 112 could thus be postponed and scheduled. If the outcome of the decision action 602 is yes, it is okay to discard a key 112 now, then the action 604 is performed and the key 112 is discarded. In a further action 610, resources are reclaimed. For example, storage memory 126 of data 128 associated with the now-deleted key 112 is dereferenced in the storage server 106 and can be reclaimed and reused for further data storage. If the outcome of the decision action 602 is no, it is not okay to discard the key 112 now, then a decision action 606 determines whether to postpone discarding of the key 112. If the answer is no, do not postpone, but it is still not okay to discard the key 112 now, then the action 608 is performed, and the key is kept or not discarded. If the answer is yes, postpone discarding of the key 112, then flow branches back to the decision action 602, to loop until it is decided to discard the key 112 or discontinue postponing and keep or not discard the key. In variations, some embodiments employ only the discarding decision action 602, some embodiments employ only the postponement decision action 606, some embodiments employ both, and some embodiments employ neither. The action 610 for reclaiming resources could also be postponed, in further embodiments. The flexibility provided by the embodiments enable the storage system 102 to decide to delete some keys now, some later, recover some storage memory 126 now, some storage memory 126 later, etc.

Figure 7:
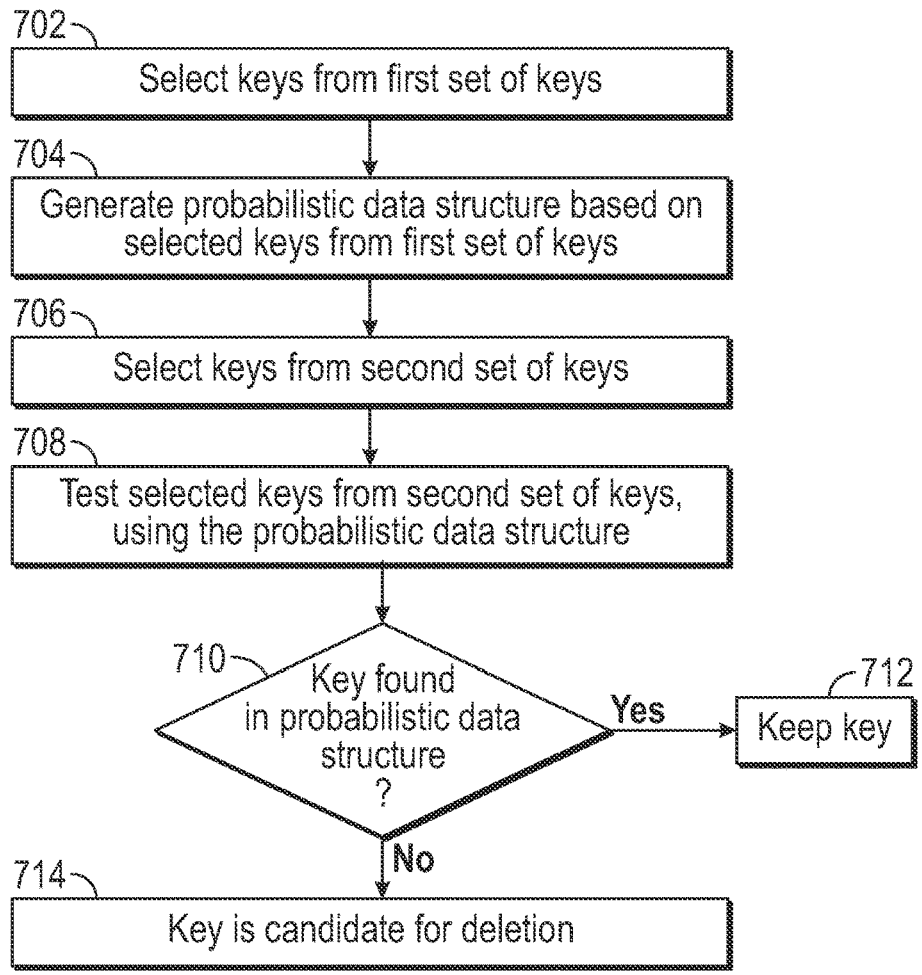
FIG. 7 is a flow diagram of a method for deleting keys from a storage system, using a probabilistic data structure in accordance with some embodiments.

FIG. 7 is a flow diagram of a method for deleting keys from a storage system, using a probabilistic data structure. The method can be practiced in embodiments of the storage system, specifically by one or more processors of the storage system. The method is general to various sets of keys, and types of probabilistic data structures, and can be practiced on keys that identify data, for example in snapshots or backups in or associated with metadata servers, and on keys that are associated with data, for example keys associated with data in storage memory in or associated with storage servers. In an action 702, keys are selected from a first set of keys. For example, a key selector could select keys based on conformity of attributes of the keys to criteria. In some embodiments, all of the keys in the first set of keys could be selected. In an action 704, a probabilistic data structure is generated, based on the selected keys from the first set of keys. For example, a Bloom filter or other suitable probabilistic data structure could be generated. In an action 706, keys are selected from a second set of keys. For example, a key selector could select keys based on conformity of attributes of the keys to criteria as mentioned above. In some embodiments, all of the keys in the second set of keys could be selected. In an action 708, the selected keys from the second set of keys are tested, using the probabilistic data structure. For example, the selected keys could be tested with a Bloom filter, as generated in the action 704.

In a decision action 710, it is determined whether the key is found in the probabilistic data structure. If the answer to the decision action 710 is yes, the key is found in the probabilistic data structure, then the action 712 is performed, and the key is kept or not discarded. If the answer to the decision action 710 is no, the key is not found in the probabilistic data structure, then the action 714 is performed, and the key is a candidate for deletion. In some embodiments the key may be deleted immediately upon not being found in the probabilistic data structure. Outcomes of the decision action are probabilistic, in accordance with the use of a probabilistic data structure. As mentioned above, use of a Bloom filter or other suitable probabilistic data structure can give false positives, but no false negatives. Other types of probabilistic data structures could have additional characteristics to the ability to provide no false negatives.

Figure 8:
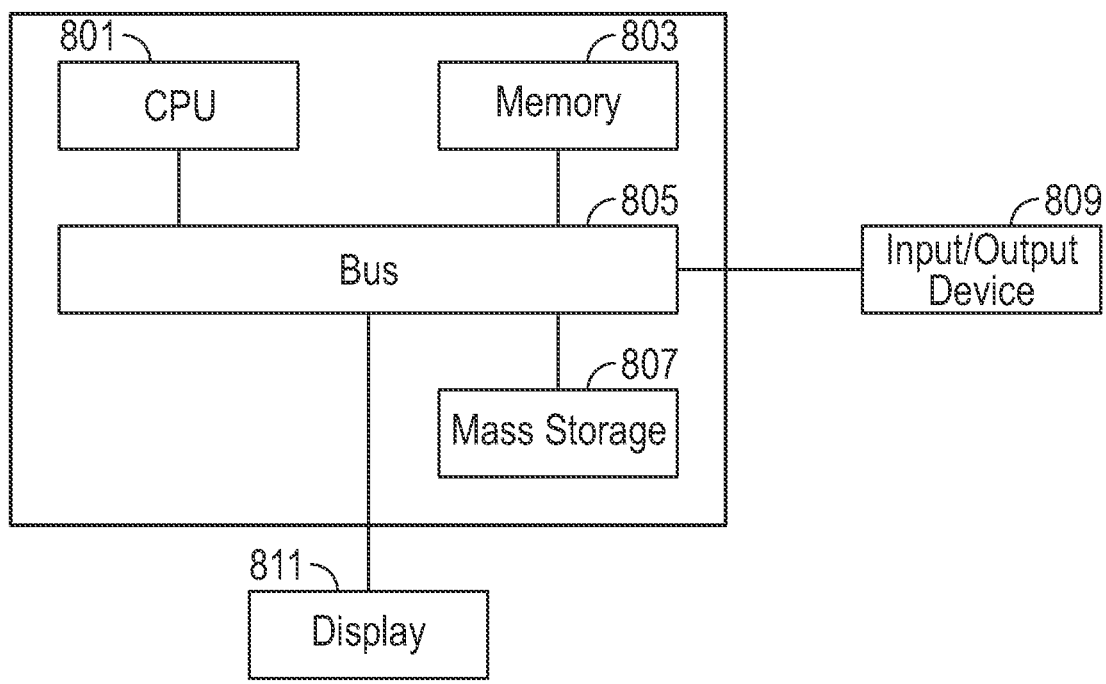
FIG. 8 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 8 is an illustration showing an exemplary computing device which may implement the embodiments described herein. The computing device of FIG. 8 may be used to perform embodiments of the functionality for generating and using probabilistic data structures for consideration of key deletion in accordance with some embodiments. The computing device includes a central processing unit (CPU) 801, which is coupled through a bus 805 to a memory 803, and mass storage device 807. Mass storage device 807 represents a persistent data storage device such as a disc drive, which may be local or remote in some embodiments. The mass storage device 807 could implement a backup storage, in some embodiments. Memory 803 may include read only memory, random access memory, etc. Applications resident on the computing device may be stored on or accessed via a computer readable medium such as memory 803 or mass storage device 807 in some embodiments. Applications may also be in the form of modulated electronic signals modulated accessed via a network modem or other network interface of the computing device. It should be appreciated that CPU 801 may be embodied in a general-purpose processor, a special purpose processor, or a specially programmed logic device in some embodiments.

Display 811 is in communication with CPU 801, memory 803, and mass storage device 807, through bus 805. Display 811 is configured to display any visualization tools or reports associated with the system described herein. Input/output device 809 is coupled to bus 805 in order to communicate information in command selections to CPU 801. It should be appreciated that data to and from external devices may be communicated through the input/output device 809. CPU 801 can be defined to execute the functionality described herein to enable the functionality described with reference to FIGS. 1-7. The code embodying this functionality may be stored within memory 803 or mass storage device 807 for execution by a processor such as CPU 801 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may also be integrated with a virtualized computing system implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/ component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
generating a probabilistic data structure associated with a first set of keys at a storage server of the storage system;
for keys in a second set of keys, determining whether any keys of the second set of keys are found in the probabilistic data structure generated at the storage server;
identifying a key of the second set of keys as a candidate for deletion from the storage system if the key is not found in the probabilistic data structure; and
recovering storage memory storing data associated with the key.

2. The method of claim 1, further comprising one of:
determining one or more criteria shared by all keys of the first set of keys; or
selecting keys for inclusion in the first set of keys by considering keys that share the one or more criteria.

3. The method of claim 2, further comprising:
considering keys sharing the one or more criteria from the second set of keys for lookup in the probabilistic data structure.

4. The method of claim 1, further comprising:
postponing actual deletion of the key identified as the candidate for deletion based on a predetermined condition.

5. The method of claim 1, further comprising:
deleting from the storage system the key identified as the candidate for deletion; and
reclaiming system resources of the storage system associated with the deleted key.

6. The method of claim 1, further comprising:
generating a further probabilistic data structure based on a third set of keys; and
merging the probabilistic data structure and the further probabilistic data structure.

7. The method of claim 1, further comprising:
distributing the probabilistic data structure to two or more locations in the storage system;
for each key in a third set of keys, determining whether a key of the third set of keys is found in the probabilistic data structure; and identifying a key from the third set of keys as the candidate for deletion if the key from the third set of keys is not found in the probabilistic data structure, wherein identifying the key as the candidate for deletion is performed at a first location in the storage system and identifying the key from the third set of keys as the candidate for deletion is performed at a second location in the storage system.

8. A storage system, comprising:
memory, configured to hold data and metadata, including keys that identify data and keys associated with data; and
one or more processors, configured to perform actions comprising:
storing data, metadata, the keys associated with one of the data or the metadata in the memory;
producing a probabilistic data structure based on a first set of the keys at a storage server of the storage system, the probabilistic data structure configured to determine whether a key tested with the probabilistic data structure is a member of the first set of keys;
for keys in a second set of keys stored in the storage system, determining whether a key of the second set of keys is found in the probabilistic data structure generated at the storage server;
identifying a key from the second set of keys as a candidate for deletion responsive to the determining finding that the key is not a member of the first set of keys; and
recovering storage memory storing data associated with the key.

9. The storage system of claim 8, wherein the actions of the one or more processors further comprises one of:
determining at least one criterion shared by keys of the first set of keys; or
populating the first set of keys with keys sharing the at least one criterion from a larger set of keys.

10. The storage system of claim 8, wherein the actions of the one or more processors further comprise:
populating the second set of keys with keys sharing the at least one criterion from a further, larger set of keys.

11. The storage system of claim 8, wherein the actions of the one or more processors further comprise:
delaying deletion of the key based on a predetermined condition.

12. The storage system of claim 8, wherein the actions of the one or more processors further comprise:
deleting from the storage system the key; and
reclaiming system resources, including a portion of the memory, of the storage system associated with the deleted key.

13. The storage system of claim 8, wherein the actions of the one or more processors further comprise:
producing a second probabilistic data structure based on a third set of keys; and
merging the probabilistic data structure and the second probabilistic data structure to form a third probabilistic data structure.

14. The storage system of claim 8, wherein the actions of the one or more processors further comprise:
distributing the probabilistic data structure to at least two locations in the storage system;
for each key in a third set of keys testing, with the probabilistic data structure, a key from the third set of keys; and
identifying a further subset of keys, from the third set of keys, when testing with the probabilistic data structure indicates keys in the further subset of keys are not members of the first set of keys, wherein the determining whether the key of the second set of keys is found in the probabilistic data structure and the identifying the key from the second set of keys are executed at a first one of the at least two locations in the storage system, and wherein the testing the key from the third set of keys and the identifying the further subset of keys are executed at a second one of the at least two locations in the storage system.

15. A storage system, comprising:

memory;

one or more processors, configured to store, in the memory, data, metadata, keys associated with one of the data and the meta data and further configured to delete one or more of the keys;

a data structure generator configured to derive a probabilistic data structure from a first set of keys that identify data such that the probabilistic data structure declares, for a query for a key, likelihood of membership of the key in the first set of keys;

a key query engine configured to query for each key in a second set of keys using the probabilistic data structure derived from the first set of keys; and a resource recovery engine configured to identify as candidates for deletion a subset of keys from the second set of keys, responsive to results of the key query engine indicating each key of the subset of keys has no probability of being a member of the first set of keys and recover storage memory storing data associated with the subset of keys.

16. The storage system of claim 15, wherein:

keys of the first set of keys share one or more criteria; and the one or more processors are further configured to select, from a larger set of keys, the second set of keys as sharing the one or more criteria.

17. The storage system of claim 15, wherein the resource recovery engine is configured to delay deletion of one or more key of the subset of keys, responsive to one of: a storage resource is busy, a server is busy, or a deletion would consume more than a predetermined number of processor cycles.

18. The storage system of claim 15, wherein the resource recovery engine is configured to delete at least one key of the subset of keys from the storage system and reclaim at least a portion of the memory associated with the deleted at least one key.

19. The storage system of claim 15, wherein the data structure generator is configured to merge two or more probabilistic data structures.

20. The storage system of claim 15 wherein differing merged combinations of probabilistic data structures are applied at differing locations within the storage system.

* * * * *